US 6,615,043 B1

(12) United States Patent
van de Berg

(10) Patent No.: US 6,615,043 B1
(45) Date of Patent: Sep. 2, 2003

(54) EFFICIENT CARRIER RASTER SCANNING

(75) Inventor: Petrus van de Berg, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 269 days.

(21) Appl. No.: 09/586,972

(22) Filed: Jun. 5, 2000

Related U.S. Application Data

(60) Provisional application No. 60/138,272, filed on Jun. 9, 1999.

(51) Int. Cl.[7] .................................................. H04Q 7/20
(52) U.S. Cl. .................. 455/434; 455/161.3; 455/186.1; 455/185.1
(58) Field of Search ........................... 455/161.1, 161.2, 455/161.3, 186.1, 166.1, 434, 185.1, 515, 450, 509, 514

(56) References Cited

U.S. PATENT DOCUMENTS

| | | | | |
|---|---|---|---|---|
| 5,457,816 A | * | 10/1995 | Koyama | 455/161.2 |
| 5,517,677 A | | 5/1996 | Moon | |
| 5,809,419 A | * | 9/1998 | Schellinger et al. | 455/166.1 |
| 5,822,686 A | * | 10/1998 | Lundberg et al. | 455/161.1 |
| 5,832,367 A | | 11/1998 | Bamburak et al. | |
| 5,940,747 A | * | 8/1999 | Grohgans et al. | 455/161.2 |
| 6,175,733 B1 | * | 1/2001 | Seekins et al. | 455/161.3 |

OTHER PUBLICATIONS

"European Digital Cellular Telecommunications System (Phase 2); Radio Subsystem Link Control (GSM 05.08)," European Telecommunication Standard, Jul. 1, 1994, pp. 1–5, 7–35.

* cited by examiner

Primary Examiner—Thanh Cong Le
Assistant Examiner—Lana Le
(74) Attorney, Agent, or Firm—Burns, Doane, Swecker & Mathis, L.L.P.

(57) ABSTRACT

A scanning operation in a mobile terminal includes storing identifiers of sub-carrier frequencies known to be in use without regard to operator identity or location of use. A first scanning of only sub-carrier frequencies identified by the stored identifiers is performed in an attempt to find a used sub-carrier frequency. If no used sub-carrier frequencies are found in the first scanning, then a second scanning of sub-carrier frequencies that are not associated with stored identifiers is performed.

14 Claims, 7 Drawing Sheets

401

| n | k | Fc IN MHz | SPACING MHz | OPERATOR | COMMENT |
|---|---|---|---|---|---|
| 0 | 2 | 1922.8 | | 1 | FIRST CARRIER MOVED INTO THE BAND |
| 1 | -1 | 1927.2 | 4.4 | 1 | TIGHT SPACING FOR SAME CELL LAYER |
| 2 | -1 | 1932.2 | 5 | 1 | |
| 3 | 2 | 1937.8 | 5.6 | 2 | MORE SPACING BETWEEN OPERATORS |
| 4 | -1 | 1942.2 | 4.4 | 2 | TIGHT SPACING FOR SAME CELL LAYER |
| 5 | -1 | 1947.2 | 5 | 2 | |
| 6 | 1 | 1952.6 | 5.4 | 3 | MORE SPACING BETWEEN OPERATORS |
| 7 | 1 | 1957.6 | 5 | 3 | |
| 8 | -2 | 1962 | 4.4 | 3 | TIGHT SPACING FOR SAME CELL LAYER |
| 9 | 1 | 1967.6 | 5.6 | 4 | MORE SPACING BETWEEN OPERATORS |
| 10 | 1 | 1972.6 | 5 | 4 | |
| 11 | -2 | 1977 | 4.4 | 4 | LAST CARRIER MOVED INTO THE BAND, TIGHT SPACING FOR SAME CELL LAYER |

FIG. 3

| FREQUENCY BAND | CHIP RATE | FIRST NOMINAL CENTER FREQUENCY F0 | NOMINAL CARRIER SPACING Fs |
|---|---|---|---|
| PAIRED IMT2000 BAND | 3.84 Mcps | 1922.4 MHz | 5 MHz |
| UNPAIRED IMT2000 BAND | 3.84 Mcps | 1902.4 MHz | 5 MHz |

| n | k | Fc IN MHz | SPACING MHz | OPERATOR | COMMENT |
|---|---|---|---|---|---|
| 0 | 2 | 1922.8 |  | 1 | FIRST CARRIER MOVED INTO THE BAND |
| 1 | -1 | 1927.2 | 4.4 | 1 | TIGHT SPACING FOR SAME CELL LAYER |
| 2 | -1 | 1932.2 | 5 | 1 |  |
| 3 | 2 | 1937.8 | 5.6 | 2 | MORE SPACING BETWEEN OPERATORS |
| 4 | -1 | 1942.2 | 4.4 | 2 | TIGHT SPACING FOR SAME CELL LAYER |
| 5 | -1 | 1947.2 | 5 | 2 |  |
| 6 | 1 | 1952.6 | 5.4 | 3 | MORE SPACING BETWEEN OPERATORS |
| 7 | 1 | 1957.6 | 5 | 3 |  |
| 8 | -2 | 1962 | 4.4 | 3 | TIGHT SPACING FOR SAME CELL LAYER |
| 9 | 1 | 1967.6 | 5.6 | 4 | MORE SPACING BETWEEN OPERATORS |
| 10 | 1 | 1972.6 | 5 | 4 |  |
| 11 | -2 | 1977 | 4.4 | 4 | LAST CARRIER MOVED INTO THE BAND, TIGHT SPACING FOR SAME CELL LAYER |

| n | k | Fc IN MHz | SPACING MHz | OPERATOR | COMMENT |
|---|---|---|---|---|---|
| 0 | 1 | 1922.6 | | | FIRST CARRIER MOVED INTO THE BAND |
| 1 | 0 | 1927.4 | 4.8 | 1 | OPERATOR NOT USING HCS |
| 2 | -1 | 1932.2 | 4.8 | 1 | |
| 3 | -2 | 1937 | 4.8 | 1 | |
| 4 | 1 | 1942.6 | 5.6 | 2 | MORE SPACING BETWEEN OPERATORS |
| 5 | -1 | 1947.2 | 4.6 | 2 | THIS OPERATOR USES HCS 2+2 |
| 6 | 0 | 1952.4 | 5.2 | 2 | MORE SPACING BETWEEN LAYERS |
| 7 | -2 | 1957 | 4.8 | 2 | |
| 8 | 1 | 1962.6 | 5.6 | 3 | MORE SPACING BETWEEN OPERATORS |
| 9 | 0 | 1967.4 | 4.8 | 3 | THIS OPERATOR USES HCS 3+1 |
| 10 | -1 | 1972.2 | 4.8 | 3 | |
| 11 | -1 | 1977.2 | 5 | 3 | LAST CARRIER MOVED INTO THE BAND, HIGHER SPACING FOR UMBRELLA CELL |

| n | k | Fc IN MHz | SPACING MHz | OPERATOR | COMMENT |
|---|---|---|---|---|---|
| 0 | 1 | 1922.6 | | 1 | FIRST CARRIER MOVED INTO THE BAND |
| 1 | -1 | 1927.2 | 4.6 | 1 | TIGHT SPACING FOR SAME OPERATOR |
| 2 | 1 | 1932.6 | 5.4 | 2 | MORE SPACING BETWEEN OPERATORS |
| 3 | -1 | 1937.2 | 4.6 | 2 | TIGHT SPACING FOR SAME OPERATOR |
| 4 | 1 | 1942.6 | 5.4 | 3 | MORE SPACING BETWEEN OPERATORS |
| 5 | -1 | 1947.2 | 4.6 | 3 | TIGHT SPACING FOR SAME OPERATOR |
| 6 | 1 | 1952.6 | 5.4 | 4 | MORE SPACING BETWEEN OPERATORS |
| 7 | -1 | 1957.2 | 4.6 | 4 | TIGHT SPACING FOR SAME OPERATOR |
| 8 | 1 | 1962.6 | 5.4 | 5 | MORE SPACING BETWEEN OPERATORS |
| 9 | 0 | 1967.4 | 4.8 | 5 | THIS OPERATOR USES HCS 3+1 |
| 10 | -1 | 1972.2 | 4.8 | 5 | AS AN EXAMPLE |
| 11 | -1 | 1977.2 | 5 | 5 | LAST CARRIER MOVED INTO THE BAND, HIGHER SPACING FOR UMBRELLA CELL |

| n | k | Fc IN MHz | SPACING MHz | OPERATOR | COMMENT |
|---|---|---|---|---|---|
| 0 | – | – | | | NOT USED |
| 1 | 2 | 1927.8 | | 1 | TIGHT SPACING FOR SAME OPERATOR |
| 2 | 1 | 1932.6 | 4.8 | 1 | TIGHT SPACING FOR SAME CELL LAYER |
| 3 | -1 | 1937.2 | 4.6 | 1 | TIGHT SPACING FOR SAME CELL LAYER |
| 4 | 1 | 1942.6 | 5.4 | 1 | MORE SPACING BETWEEN LAYERS |
| 5 | 0 | 1947.4 | 4.8 | 1 | TIGHT SPACING FOR SAME CELL LAYER |
| 6 | -1 | 1952.2 | 4.8 | 1 | TIGHT SPACING FOR SAME CELL LAYER |
| 7 | -1 | 1957.2 | 5 | 1 | TIGHT SPACING FOR SAME CELL LAYER |
| 8 | -2 | 1962 | 4.8 | 1 | MORE SPACING TO NEIGHBORING SERVICES |
| 9 | – | | | | NOT USED |
| 10 | – | | | | NOT USED |
| 11 | – | | | | NOT USED |

701

EFFICIENT CARRIER RASTER SCANNING

This application claims the benefit of provisional application 60/138,272 filed Jun. 9, 1999.

BACKGROUND

The present invention relates to mobile communication, and more particularly to methods and apparatuses for efficiently finding a carrier frequency from among a large number of possible carrier frequencies.

Modern mobile communications systems (e.g., cellular telephone systems) rely on wireless media, such as radio technology, to communicate information between communicating parties. Communication is effected by imposing (e.g., via modulation) the desired information (e.g., information representing audio information) onto a carrier frequency. Thus, for communication to take place, the communicating parties must agree on which carrier frequency to use.

The range of useable carrier frequencies is limited, and is therefore allocated according to government regulations. Having allocated a portion of the radio frequency spectrum for use by a particular type of communication technology (e.g., mobile communication devices operating in accordance with any of the IMT-2000 (ITU), Universal Mobile Telecommunications System (UMTS) or Enhanced Data rates for GSM and TDMA/136 Evolution (EDGE) standards, all of which are considered to be third-generation systems), the allocated bandwidth must still be further divided into a number of sub-bands which are allocated for use by different system operators. Depending on the number of operators present in any particular geographic area, each operator may be allocated only a handful of these sub-bands.

Given a channel raster of a given bandwidth and a desired spacing between carrier center frequencies, the number of possible carrier frequencies may be determined. For example, the UMTS system calls for a defined 2×60 MHZ bandwidth used for Frequency Division Duplex (FDD) to be divided up into 5 MHZ-wide carriers, thus there are 60/5=12 of them. A raster is defined of 200 kHz, which allows 25 subcarrier positions within a 5 MHZ bandwidth. Thus, there are 12×25=300 possible carrier positions.

Although 300 possible sub-carriers may be defined, it is anticipated that only a small sub-set of them are actually required. For example, in a UMTS, FDD system, only one fifth of the potential sub-carriers (each 200 kHz wide) are expected to be used independent of operator or location, due to frequency regulations defined in each country. However, a mobile terminal that has lost contact with a system (e.g., by having been powered off, or by having moved out of range of a previously serving system) needs to regain contact, and this is done by locating a sub-carrier frequency that is being used by a nearby system. One strategy for doing this has the mobile terminal scanning all of the possible 300 sub-carriers until it finds one that is in use. However, this can be a lengthy process. Considering that only one fifth of the possible sub-carriers would actually be in use, it is apparent that the process of setting out to scan all of the sub-carriers wastes not only time, but also energy, which is a precious commodity in a battery-powered device.

It has been proposed to address this problem by supplying mobile terminals with information that identifies, for each known service area, the sub-carriers that are in use. One way of supplying this information is by broadcasting it to the mobile terminal, which then stores it in a memory. In operation, whenever a mobile terminal loses contact with a service provider, it first "guesses" its present location, and uses this guess to retrieve a list of sub-carriers that are known to be in use in the guessed location. The sub-carriers in the list are then scanned by the mobile terminal. If the guess was correct, then a sub-carrier should be found with a reduced amount of effort. However, if the guess is incorrect, then the initial scanning operation may not turn up a sub-carrier, in which case the mobile terminal may have to resort to scanning all possible sub-carriers until one is found. Thus, this technique suffers from the problem of only being as good as the mobile terminal's guess and that it is practically impossible to have complete information about all the service areas. However, many mobile terminals are routinely turned off just prior to travel, for example on aircraft. Thus, a mobile terminal can hardly be expected to be very accurate in guessing where it is when it is turned on.

Another solution is to predefine possible carrier positions, and thus reduce the number of carriers that have to be scanned. This would give less flexibility, and would probably degrade the overall capacity.

Yet another proposed solution involves allocating a common channel that, in every service area, provides information identifying which sub-carrier frequencies should be searched on first priority. Such a solution provides a perfect scanning, and therefore requires only a minimum of search time. However, this solution requires that operators worldwide agree on a common solution for a world-wide logical or physical pilot channel, and that the operators be willing to provide in their common channel parts, information about competitive systems.

So far, the above examples have focused on examples that refer to the FDD part of the UMTS (also known as the "paired band"). However, the same issues arise as well in connection with the Time Division Duplex (TDD) part of the UMTS band (also known as the "unpaired band").

Because of the difficulty in obtaining universal agreement on these issues, it is desirable to find yet another approach that will reduce the scan time performed by mobile terminals and that can be based on the Universal Terrestrial Radio Access (UTRA) concept itself.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses for operating a mobile terminal. This includes storing identifiers of sub-carrier frequencies known to be in use without regard to operator identity or location of use. A first scanning of only sub-carrier frequencies identified by the stored identifiers is performed to find a used sub-carrier frequency. If no used sub-carrier frequencies are found in the first scanning, then a second scanning of sub-carrier frequencies that are not associated with stored identifiers is performed.

BRIEF DESCRIPTION OF THE DRAWINGS

The objects and advantages of the invention will be understood by reading the following detailed description in conjunction with the drawings in which:

FIG. 3 is a table showing values of the parameters $F_0$, $F_s$ and $N_c$ for a paired IMT-2000 band and for an unpaired IMT-2000 band;

FIG. 4 is a table showing an exemplary carrier allocation scheme for four operators in 2×59.45 MHZ, giving 2×14.8 MHZ for each operator;

FIG. 5 is a table showing an exemplary carrier allocation scheme for three operators in 2×20 MHZ;

FIG. 6 is a table showing an exemplary carrier allocation scheme for five operators in 4×2×10 MHZ and 1×2×20 MHZ; and FIG. 7 is a table showing an exemplary carrier allocation scheme for one operator in 2×40 MHZ somewhere in the IMT-2000 paired band.

DETAILED DESCRIPTION

Figure 1:
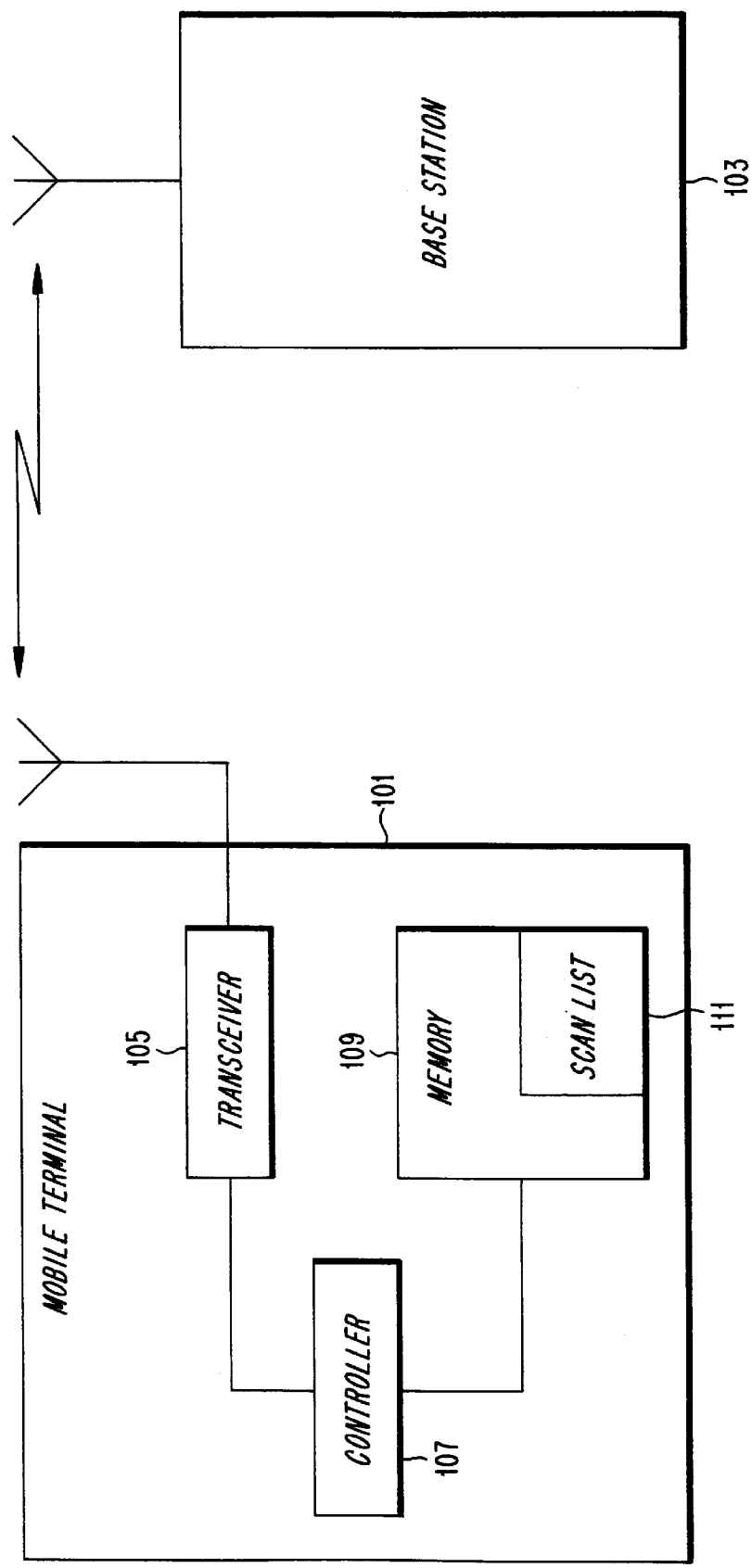
FIG. 1 is a block diagram of hardware elements for carrying out the invention.

The various features of the invention will now be described with respect to the figures, in which like parts are identified with the same reference characters.

These and other aspects of the invention will now be described in greater detail in connection with a number of exemplary embodiments. To facilitate an understanding of the invention, many aspects of the invention are described in terms of sequences of actions to be performed by elements of a computer system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable storage medium having stored therein an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiment may be referred to herein as "logic configured to" perform a described action.

FIG. 1 is a block diagram of elements for carrying out the invention. A mobile terminal 101 (e.g., a cellular telephone, personal digital assistant, mobile computing device, etc.) is provided for providing mobile communication. The mobile terminal is capable of wireless (e.g., radio) communication with a base station 103 that is operated by a service provider. The base station 103 is but one element in a land-based network that may further include, but is not limited to, such elements as a Mobile Switching Center (MSC), Home Location Register (HLR) and Visitor Location Register (VLR). The configuration of such elements to form a Public Land Mobile Network (PLMN) is well-known, and need not be described here in detail.

As explained in the BACKGROUND section, it is possible for the mobile terminal 101 to lose contact with a service provider. This may occur, for example, if the mobile terminal 101 has been powered off. The challenge when the mobile terminal 101 is powered on in the vicinity of the base station 103 is to identify which of the possible 300 sub-carriers is being used by the base station 103. To assist in this endeavor, the mobile terminal includes not only transceiver circuitry 105 (which may be of conventional design, and therefore need not be described here in detail), but also a control circuit 107, and a memory unit 109. The control circuit 107 has access to information stored in the memory circuit 109, and also is able to control the scanning procedure carried out by the transceiver circuitry 105. As will be described further below, the memory circuit 109 has stored therein a scan list 111 that identifies those candidate frequencies that are most-likely to be used as sub-carriers.

Although in some embodiments it is possible to have the memory unit 109 located in a removable Subscriber Information Module (SIM) (SIMs are well-known in the art), it is preferable to utilize a non-removable memory circuit. The reason for this is that the information to be stored therein (i.e., the scan list 111) does not change from one subscriber to the next, and can thus be stored into the memory circuit 109 (and hence also the mobile terminal 101) at the time of the mobile terminal's manufacture.

Figure 2:
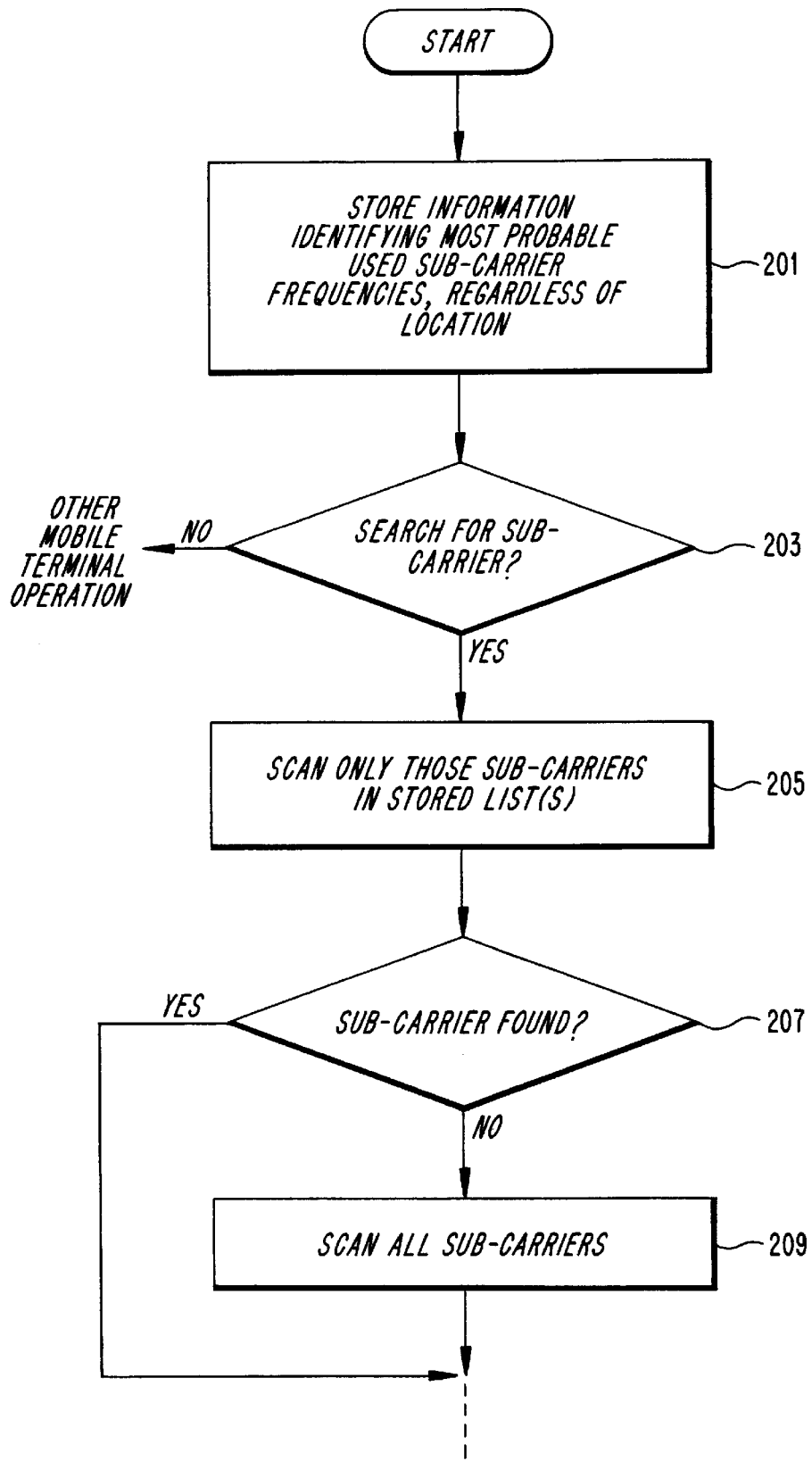
FIG. 2 is a flow chart that illustrates steps performed in accordance with the invention.

FIG. 2 is a flow chart that illustrates steps performed in accordance with the invention. The strategy adopted is to have the mobile terminal 101 first scan the candidate sub-carriers that are most-likely to be in use. If that is successful, the sub-carrier identified by the initial scanning process is used. If the initial scan of most likely carriers is not successful, then a conventional scan of all sub-carriers can be performed. Alternatively, instead of scanning all sub-carriers, embodiments can be devised that scan only those ones of the sub-carriers that were not already scanned in the initial scan of the "most-likely" sub-carriers. By initially scanning only the most likely sub-carriers, the scanning effort exerted by the mobile terminal 101 can, in general, be greatly reduced, since it is expected to be successful most of the time.

Referring now to FIG. 2, the most probable sub-carrier frequencies are stored into the memory 109 (step 201). Possible carriers depend on planning either the operator's own capacity, or the overall capacity within a country or region. Based on available frequency band borders in the frequency band spectrum, both totally and between operators, the most probable carriers to scan are estimated. For this purpose, the designer should consult the various rules and regulations that determine how frequencies are to be allocated in the various geographical regions in which it is expected that the mobile unit will be operated. These rules and/or regulations enable one to estimate how frequencies will be allocated in the pertinent geographical region, thereby deriving the most probable carriers to scan. In the UMTS FDD band for example, in some regions a minimum distance of 5 MHZ is required between carriers of different operators. The distance that is desirable between carriers of a single operator can be chosen by the operator based on evaluation of capacity for different scenarios. Some simulations have shown that a minimum useful carrier distance is 4.4 MHZ.

The particular form of storage is not essential to the invention. For example, the identities of the most probable sub-carrier frequencies may be stored in the form of one or more lists. Alternatively, it may be possible to define a formula from which the list may be derived. To facilitate a description of the invention, the term "list" is used herein to refer to any and all such forms of data storage, and the term "retrieval" is used to refer to any means by which the list is generated from the information actually stored in the memory 109. The stored information is represented in FIG. 1 as the scan list 111. It will be appreciated that while only a single scan list 111 is shown, in some embodiments several lists may in fact be implemented. For example, a first list may define the most probable carriers to scan. In addition, a second list may define a second tier of second most probable carriers to scan. Additional lists, each representing a decreasingly probable set of carriers, could also be defined. In one embodiment, a first list can be a predefined list while a second list is an updatable one. The particular choice of whether to have one, two, or even more lists is application specific, and beyond the scope of the invention.

Having stored a scan list (or lists) of frequencies that are the most likely candidate sub-carriers, the mobile terminal 101 is operated in accordance with known procedures so long as there is no need to search for a sub-carrier ("NO" path out of decision block 203). When it is determined that a search for a sub-carrier must be performed ("YES" path out of decision block 203) (e.g., after determining that the mobile terminal has lost contact with a service provider, or after being powered on), the scan list 111 is retrieved from the memory 109 and only those sub-carriers identified in the scan list 111 are scanned (step 205). In practice, this list should be substantially shorter than a list of all possible sub-carriers. Consequently, the first scanning operation that is performed here involves substantially smaller effort than a full scan of frequencies, while at the same time is very likely to be successful (i.e., to identify a sub-carrier that can be used). For those embodiments in which more than one list 111 is stored, the lists should be scanned in an order that starts with the most likely sub-carriers, and continues with carriers associated with a decreasing probability of success. For example, where two lists are used, namely, a predefined list and an updatable one as described above, an estimate of which list will get the best hit ratio in the first scanning can be made prior to any scanning activity, and that list with the highest probability can be scanned first. For example, the updatable list might be the most probable to result in a hit if the terminal has been connected to the same network the last few times of connection.

After the first scanning operation is performed, a test is performed to determine whether a suitable sub-carrier was found as a result of the first scanning operation (decision block 207). If the first scanning operation was successful ("YES" path out of decision block 207), then operation of the mobile terminal 101 continues in accordance with known techniques.

If the first scanning operation was not successful ("NO" path out of decision block 207), then a more complete scan operation is performed (step 209). In some embodiments, this may mean performing a full scan of all possible sub-carriers. In alternative embodiments, this may instead mean scanning only those possible sub-carriers that were not scanned in the first scan operation (i.e., those sub-carriers that are not identified in the scan list 111). Following this second scanning, operation of the mobile terminal 101 continues in accordance with known techniques.

It can be seen, then, that by performing a two-tiered channel scanning operation (i.e.,g one in which a first scan searches only for most-likely sub-carriers, followed by a more complete scan if necessary), substantial processing effort on the part of the mobile terminal 101 can be eliminated, since the first scanning operation is very likely to be successful. It will be further appreciated that by defining the scan list to include the most probable sub-carrier frequencies, regardless of where or by which service provider, the invention can be put into practice without having to first obtain agreement between various service providers concerning how to transmit sub-carrier lists to mobiles, and without requiring that a mobile terminal first "guess" where it is presently located so that it can determine which of possibly many different sub-carrier lists it should be using.

Although it is not an essential feature, it is possible to expand on the invention described above. For example, certain operators (i.e., service providers) may require more flexibility for a specific frequency band in a certain country or region than the default set of sub-carrier frequencies identified in the scan list 111. Certain countries or regions have a special carrier allocation where the method will improve scanning less than usual, because it is probable that a second scanning will have to be relied upon. However, the method can be enhanced by updating the frequency list (e.g., the updatable list as described above) as the terminal connects to different networks and stores carrier frequencies used in these networks.

The updatable list could also be used within the networks that the terminal connects to. The frequencies are then stored, because it is probable that the terminal will reconnect to this network.

The above-described techniques also permit the terminal to improve search times in the home and regularly visited networks, as the terminal can store these carrier frequencies as very likely.

As mentioned earlier, it is possible to utilize a formula that defines a set of most probable carriers. One possible formula for a default carrier frequency subset of 60 center frequencies, $F_c$, within a channel raster of 200 kHz in 2×60 MHZ is:

$$F_c = F_0 + F_s * n + 200 \text{ kHz} * k - 2 \leq k \leq 2; \ 0 \leq n \leq 11$$

$$F_0 = 1922.4 \text{ MHZ Up-link}; \ 2112.4 \text{ MHZ Down-Link};$$

$$F_s = 5 \text{ MHZ}.$$

where $F_0$ is the first nominal center frequency.

The parameters $F_0$ and $F_s$ depend on the chiprate and the frequency band that are used. FIG. 3 is a table 301 showing values of these parameters for a paired IMT-2000 band and for an unpaired IMT-2000 band.

Next, a number of exemplary carrier allocations are presented. From such allocations, a list of most probable frequencies to scan can be generated. Examples of allocations for both Hierarchical Cell Structure (HCS) and non-HCS systems are presented. Of course, these are only a few examples of possible carrier allocations. It should be appreciated that there are many other possible allocations that are not illustrated.

FIG. 4 is a table 401 showing an exemplary carrier allocation scheme for four operators in 2×60 MHZ, giving 2×14.8 MHZ for each operator. This means that the first and last carriers are moved 400 kHz to the center of the UMTS band to reduce the total bandwidth from 4×15 to 4×14.8 MHZ. The exemplary allocation shown in table 401 is consistent with the above-described formula and fulfills the requirements, that is, it provides more spacing between operators, medium spacing for inter-layer borders, and less spacing for cells in the same layer. The table 401 shows proposed values for k for each basic carrier n, the corresponding carrier center frequency, $F_c$, the spacing from the preceding carrier, which of the operators will use the carrier, and a comment regarding carrier spacing.

FIG. 5 is a table 501 showing an exemplary carrier allocation scheme for three operators in 2×20 MHZ. Again, the requirements can be met. Examples are shown for operators using only a single layer or HCS with different number of cells in the different layers. Guard bands are also taken into account.

FIG. 6 is a table 601 showing an exemplary carrier allocation scheme for five operators in 4×2×10 MHZ and 1×2×20 MHZ. Again, the requirements can be met. This example includes HCS with 3 and 1 frequencies in the two layers of the operator using, 20 MHZ, but the other cases would work in the same way as shown in the example of FIG. 5. Again, guard bands are taken into account.

FIG. 7 is a table 701 showing an exemplary carrier allocation scheme for one operator in 2×40 MHZ somewhere in the IMT-2000 paired band. This example shows that a large frequency allocation can be accommodated, including for example HCS.

The above examples show that sensible frequency allocations can be found for various cases based on the formula above. However, if the totally flexible carrier raster were to be used, then all mobile stations all over the world at all times would have to perform an exhaustive frequency scan whenever they find themselves in out-of-coverage scenarios. This would have a serious impact on standby times in such scenarios, and could lead to unpredictable behavior of the mobile station from the end user's point of view, depending on whether the mobile terminal happens to be in or out of coverage. Obviously, an unexpected failure of the service (e.g., a failure that occurs the morning after an excessive battery drainage that occurred overnight) would be very badly perceived by the customer.

It is for the above reasons that the efficient carrier raster scanning techniques described above provide improvements over conventional scanning techniques.

The invention has been described with reference to a particular embodiment. However, it will be readily apparent to those skilled in the art that it is possible to embody the invention in specific forms other than those of the preferred embodiment described above. This may be done without departing from the spirit of the invention.

For example, the number of lists implemented in any of the embodiments is not essential to the invention. There could be one, two, or any number of lists that define, in varying degrees, the most probable carriers to yield a hit when a scan is performed.

Also, many of the examples refer to the FDD part of the UMTS (i.e., the so-called paired band). However, the invention is equally applicable to the TDD part of the UMTS band (i.e., the so-called unpaired band).

Thus, the preferred embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a mobile terminal, comprising:
   storing identifiers of sub-carrier frequencies known to be in use without regard to operator identity or location of use;
   first scanning only sub-carrier frequencies identified by the stored identifiers to find a used sub-carrier frequency;
   if no used sub-carrier frequencies are found in the first scanning, then performing a second scanning of sub-carrier frequencies that are not associated with stored identifiers.

2. The method of claim 1, wherein the step of storing identifiers comprises storing a list of identifiers of sub-carrier frequencies known to be in use without regard to operator identity or location of use.

3. The method of claim 1, wherein the step of storing identifiers comprises storing a formula for generating a list of identifiers of sub-carrier frequencies known to be in use without regard to operator identity or location of use.

4. The method of claim 1, wherein the step of storing identifiers comprises:
   storing a predefined list of identifiers of sub-carrier frequencies known to be in use without regard to operator identity or location of use; and
   storing an updatable list of identifiers of sub-carrier frequencies known to be in use without regard to operator identity or location of use.

5. The method of claim 4, wherein the step of first scanning only sub-carrier frequencies identified by the stored identifiers to find a used sub-carrier frequency comprises:
   determining which of the predefined list and the updatable list is a most likely list; and
   scanning the most likely list before scanning a remaining one of the predefined list and the updatable list.

6. The method of claim 1, wherein the second scanning scans all possible sub-carrier frequencies.

7. The method of claim 1, wherein the second scanning scans only sub-carrier frequencies that are not associated with stored identifiers.

8. An apparatus that controls operation of a mobile terminal, comprising:
   a memory circuit that stores identifiers of sub-carrier frequencies known to be in use without regard to operator identity or location of use;
   logic that first scans only sub-carrier frequencies identified by the stored identifiers to find a used sub-carrier frequency;
   logic that performs a second scanning of sub-carrier frequencies that are not associated with stored identifiers if no used sub-carrier frequencies are found in the first scanning.

9. The apparatus of claim 8, wherein the memory circuit stores a list of identifiers of sub-carrier frequencies known to be in use without regard to operator identity or location of use.

10. The apparatus of claim 8, wherein the memory circuit stores a formula for generating a list of identifiers of sub-carrier frequencies known to be in use without regard to operator identity or location of use.

11. The apparatus of claim 8, wherein the memory circuit stores:
   a predefined list of identifiers of sub-carrier frequencies known to be in use without regard to operator identity or location of use; and
   an updatable list of identifiers of sub-carrier frequencies known to be in use without regard to operator identity or location of use.

12. The apparatus of claim 11, wherein the logic that first scans only sub-carrier frequencies identified by the stored identifiers to find a used sub-carrier frequency comprises:
   logic that determines which of the predefined list and the updatable list is a most likely list; and
   logic that scans the most likely list before scanning a remaining one of the predefined list and the updatable list.

13. The apparatus of claim 8, wherein the logic that performs the second scanning scans all possible sub-carrier frequencies.

14. The apparatus of claim 8, wherein the logic that performs the second scanning scans only sub-carrier frequencies that are not associated with stored identifiers.

* * * * *